United States Patent
Tsuiki et al.

(10) Patent No.: US 11,697,932 B2
(45) Date of Patent: Jul. 11, 2023

(54) TOILET DEVICE

(71) Applicant: TOTO LTD., Kitakyushu (JP)

(72) Inventors: Shoichi Tsuiki, Kitakyushu (JP); Motoki Kobayashi, Kitakyushu (JP); Yuya Masahira, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 63 days.

(21) Appl. No.: 16/568,039

(22) Filed: Sep. 11, 2019

(65) Prior Publication Data

US 2020/0123752 A1    Apr. 23, 2020

(30) Foreign Application Priority Data

Oct. 23, 2018    (JP) .................. 2018-199350

(51) Int. Cl.
  *E03D 5/10*    (2006.01)
  *E03D 11/00*   (2006.01)
(52) U.S. Cl.
  CPC .............. *E03D 5/10* (2013.01); *E03D 11/00* (2013.01)
(58) Field of Classification Search
  CPC .................................................. E03D 5/10
  USPC ............................................... 4/300
  See application file for complete search history.

(56) References Cited

U.S. PATENT DOCUMENTS

| 4,203,173 A * | 5/1980 | Morris | E03D 11/00 4/427 |
| 9,644,357 B2 * | 5/2017 | Bowcutt | G01F 23/0061 |
| 9,896,831 B2 * | 2/2018 | Bowcutt | E03D 5/00 |
| 2003/0201018 A1 * | 10/2003 | Bush | G05D 7/0641 137/624.11 |
| 2008/0141447 A1 * | 6/2008 | Bowcutt | G01F 23/0007 4/427 |
| 2018/0371734 A1 * | 12/2018 | Salemi Parizi | E03D 11/00 |

FOREIGN PATENT DOCUMENTS

| CN | 201485931 U | 5/2010 |
| JP | 2013-72221 A | 4/2013 |
| JP | 2013072221 A * | 4/2013 |
| JP | 2016061030 A * | 4/2016 |

OTHER PUBLICATIONS

JP-2013072221-A Machine Translation (Year: 2021).*
JP-2016061030-A Machine Translation (Year: 2022).*

* cited by examiner

*Primary Examiner* — David P Angwin
*Assistant Examiner* — William R Klotz
(74) *Attorney, Agent, or Firm* — Pearne & Gordon LLP (57) ABSTRACT

According to an embodiment, a toilet device includes a detector configured to detect at least one of a water level inside a flush toilet or an indicator associated with the water level, a clog determiner determining a clog state of the flush toilet based on a detection result of the detector, and a controller determining, based on a determination result of the clog determiner, whether or not to prohibit a flushing water supply to the flush toilet. The controller sets a flush prohibition time at least after the flushing water supply to the flush toilet has ended. A flush operation for flushing the flush toilet not is accepted temporarily in the flush prohibition time. The clog determiner determines the clog state of the flush toilet based on the detection result of the detector within the flush prohibition time or directly after the flush prohibition time.

6 Claims, 8 Drawing Sheets

TOILET DEVICE

CROSS-REFERENCE TO RELATED APPLICATIONS

This application is based upon and claims the benefit of priority from Japanese Patent Application No. 2018-199350, filed on Oct. 23, 2018; the entire contents of which are incorporated herein by reference.

FIELD

Embodiments described herein relate generally to a toilet device.

BACKGROUND

In JP-A 2013-72221 (Kokai), technology is discussed in which a clog determination of a flush toilet is performed based on water level information inside the flush toilet after flushing. According to this technology, the accuracy of the determination can be increased because the clog determination is performed in a state in which the water level inside the flush toilet is stable.

There are cases where the next user uses the same flush toilet directly after a previous user has flushed the flush toilet. In such a case, the next user may perform a flush operation to flush the flush toilet directly after starting the use. Thus, if the flush operations are performed consecutively in a short period of time, there is a possibility that the water may overflow from the flush toilet without completing the clog determination because the next toilet flush is performed before the water level stabilizes.

SUMMARY

A toilet device according to an embodiment includes a detector, a clog determiner, and a controller; the detector is configured to detect at least one of a water level inside a flush toilet or an indicator associated with the water level; based on a detection result of the detector, the clog determiner determines a clog state of the flush toilet; based on a determination result of the clog determiner, the controller determines whether or not to prohibit a flushing water supply to the flush toilet; the controller sets a flush prohibition time at least after the flushing water supply to the flush toilet has ended; a flush operation for flushing the flush toilet is not accepted temporarily in the flush prohibition time; and the clog determiner determines the clog state of the flush toilet based on the detection result of the detector within the flush prohibition time or directly after the flush prohibition time.

DETAILED DESCRIPTION

A first invention is a toilet device, comprising a detector, a clog determiner, and a controller; the detector is configured to detect at least one of a water level inside a flush toilet or an indicator associated with the water level; based on a detection result of the detector, the clog determiner determines a clog state of the flush toilet; based on a determination result of the clog determiner, the controller determines whether or not to prohibit a flushing water supply to the flush toilet; the controller sets a flush prohibition time at least after the flushing water supply to the flush toilet has ended; a flush operation for flushing the flush toilet is not accepted temporarily in the flush prohibition time; and the clog determiner determines the clog state of the flush toilet based on the detection result of the detector within the flush prohibition time or directly after the flush prohibition time.

According to the toilet device, the flush prohibition time is set after the flushing water supply to the flush toilet has ended; therefore, directly after the flushing water is supplied to the flush toilet, the flushing water is not supplied to the flush toilet even if the flush operation is performed. Accordingly, the overflow of the water from the flush toilet due to the flushing water being supplied continuously in the state in which the flush toilet is clogged can be prevented. Also, because the flushing water is not supplied within the flush prohibition time or directly after the flush prohibition time, the water level inside the flush toilet stabilizes; and a more accurate determination result can be obtained.

A second invention is the toilet device of the first invention, wherein the clog determiner determines the clog state of the flush toilet after a prescribed period of time after the flushing water supply to the flush toilet has ended.

According to the toilet device, compared to directly after the end of the flushing water supply, the clog state of the flush toilet can be determined in a state in which the water level is more stable. Therefore, it is possible to determine the clog state of the flush toilet more accurately.

A third invention is the toilet device of the first or second invention, wherein when the clog determiner cannot determine the clog state of the flush toilet within the flush prohibition time, the controller extends the flush prohibition time; and the clog determiner determines the clog state of the flush toilet in the extended flush prohibition time.

According to the toilet device, the flush prohibition time is extended automatically even when time is necessary to determine the clog state. Therefore, the overflow of the water due to the flushing water being supplied to a state in which the flush toilet is clogged can be prevented more reliably.

A fourth invention is the toilet device of any one of the first to third inventions, wherein when the flush operation is input within the flush prohibition time, the controller supplies flushing water to the flush toilet at a timing when the determining by the clog determiner is completed and the flush toilet is determined not to be clogged.

According to the toilet device, an operation that matches the intention of the user is realized automatically after the end of the determination while preventing the overflow of the water from the flush toilet. Therefore, it is unnecessary for the user to perform the flush operation again after the flush prohibition time; and the ease of use of the toilet device improves.

A fifth invention is the toilet device of any one of the first to fourth inventions, wherein the controller further sets the flush prohibition time when performing the flushing water supply to the flush toilet.

According to the toilet device, the increase of the flushing water supplied to the flush toilet can be prevented; and the overflow of the water when the flush toilet is clogged can be prevented more reliably.

A sixth invention is the toilet device of any one of the first to fifth inventions, wherein the controller releases the setting of the flush prohibition time at a timing when the clog determiner determines the flush toilet not to be clogged.

According to the toilet device, the flush prohibition time can be shortened while preventing the overflow of the water from the flush toilet; and the ease of use improves.

Embodiments of the invention will now be described with reference to the drawings. Similar components in the drawings are marked with the same reference numerals; and a detailed description is omitted as appropriate.

Figure 1:
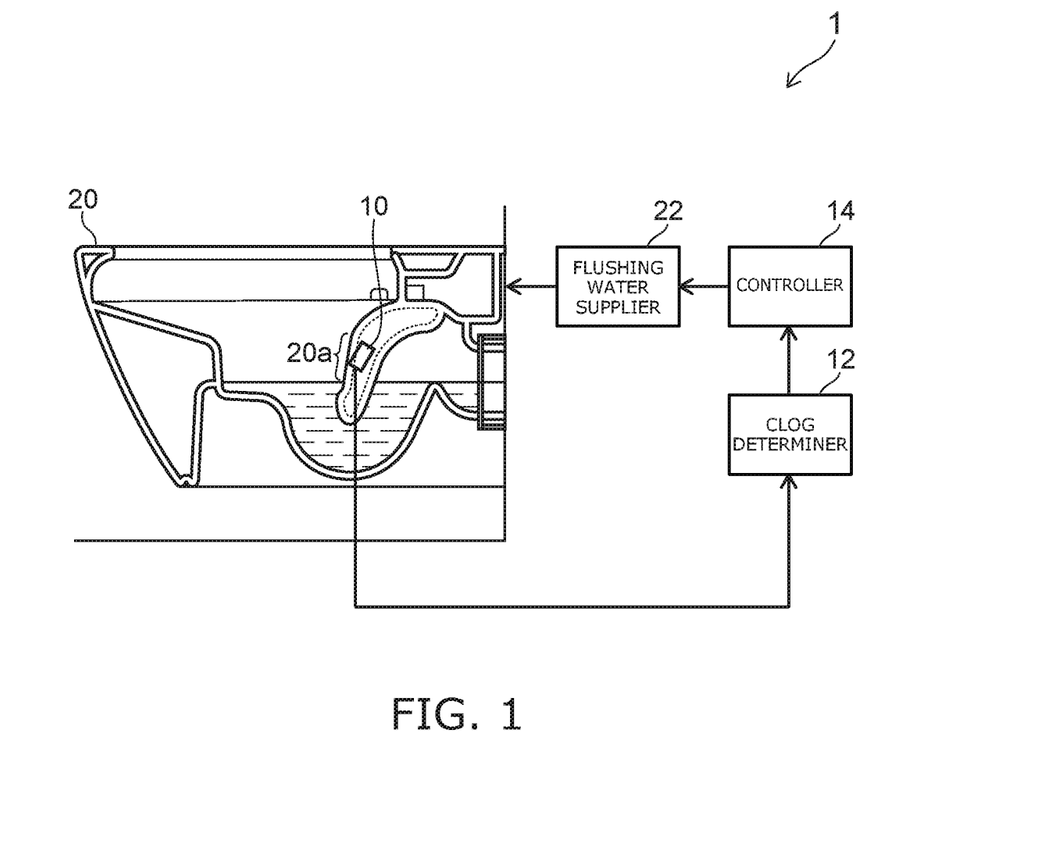
FIG. 1 is a schematic view illustrating the configuration of a toilet device according to an embodiment.

FIG. 1 is a schematic view illustrating the configuration of a toilet device according to the embodiment.

As illustrated in FIG. 1, the toilet device 1 according to the embodiment includes a detector 10, a clog determiner 12, and a controller 14. The toilet device 1 uses a flush toilet 20 and a flushing water supplier 22 in combination. Or, the toilet device 1 may include the flush toilet 20 and the flushing water supplier 22.

In this specification, upward when viewed by a user seated on the flush toilet 20 is taken as "up;" and the reverse direction is taken as "down." Frontward when viewed by the user seated on the flush toilet 20 is taken as "front;" and the reverse direction is taken as "back."

Figure 2A:
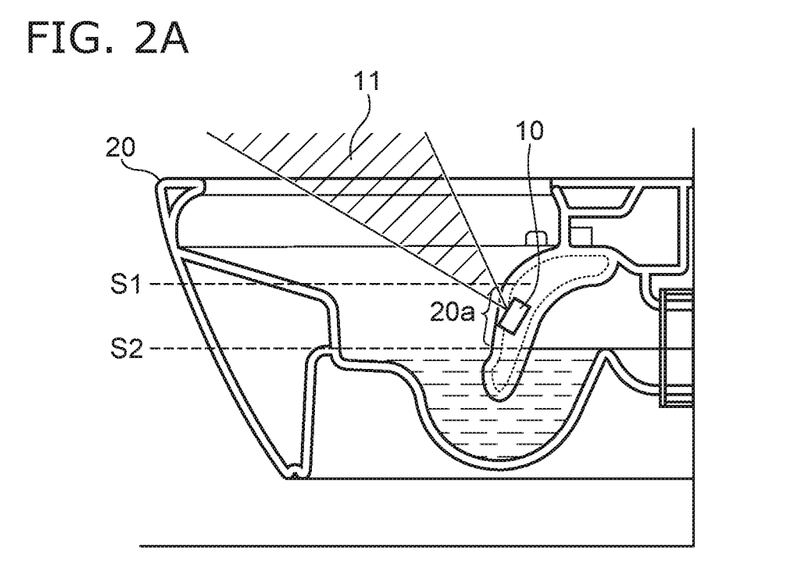
FIGS. 2A and 2B are schematic cross-sectional views illustrating a part of the toilet device according to the embodiment.
Figure 2B:
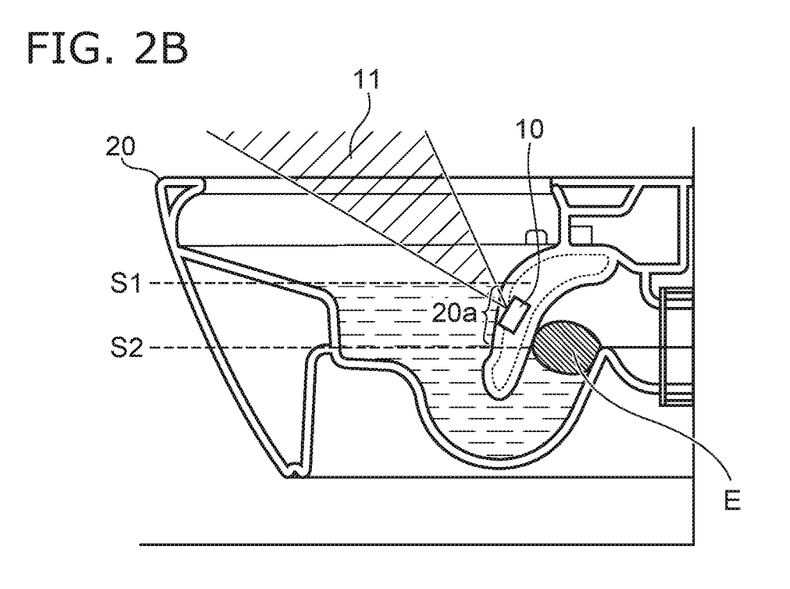

FIGS. 2A and 2B are schematic cross-sectional views illustrating a part of the toilet device according to the embodiment.

The detector 10 is configured to detect at least one of the water level inside the flush toilet 20 or an indicator associated with the water level. The "indicator associated with the water level" is, for example, the existence or absence of water at a prescribed region of a surface inside the flush toilet 20, the pressure of the water collected inside the flush toilet 20, etc. A radio wave sensor, a capacitive sensor, a pressure sensor, an ultrasonic distance sensor, an optical distance sensor, or the like is used as the detector 10.

The radio wave sensor radiates a radio wave and detects the reflected wave. The strength of the reflected wave changes according to the existence or absence of water at the position where the radio wave is radiated. When a radio wave sensor is used as the detector 10, the detector 10 is provided so that the radio wave is radiated toward the prescribed region of the surface inside the flush toilet 20.

A capacitive sensor detects the electrostatic capacitance between the sensor and a prescribed region opposing the sensor. The electrostatic capacitance changes according to the existence or absence of the water at the prescribed region. When the capacitive sensor is used as the detector 10, the detector 10 is provided to oppose the prescribed region of the surface inside the flush toilet 20.

By using the radio wave sensor or the capacitive sensor as the detector 10, it can be detected whether or not the water level inside the flush toilet 20 is at a position higher than a prescribed region.

An electrostatic sensor can detect the water level directly by arranging the electrostatic sensors consecutively at multiple locations having different heights.

A pressure sensor detects the pressure of the water collected inside the flush toilet 20. The pressure is proportional to the amount of the water inside the flush toilet 20. Accordingly, the water level can be detected indirectly by using the pressure sensor as the detector 10.

An ultrasonic distance sensor radiates an ultrasonic wave and receives the reflected wave. If the ultrasonic wave is radiated in a direction perpendicular to the water surface, the time from radiating the ultrasonic wave until the peak of the reflected wave is detected changes according to the position of the water surface.

An optical distance sensor irradiates light (e.g., infrared light) toward an object and images the reflected light on a light-receiving element. The imaging position of the light-receiving element changes according to the position of the water surface.

Accordingly, the water level inside the flush toilet 20 can be detected directly by using the ultrasonic distance sensor or the optical distance sensor as the detector 10.

FIGS. 2A and 2B illustrate the case where a radio wave sensor is provided inside the flush toilet 20 and used as the detector 10. In the example, the detector 10 radiates a radio wave 11 and detects whether or not the water is at a surface 20a inside the flush toilet 20. The surface 20a is at a position that is lower than an overflow surface S1 and higher than a water seal surface S2. A case will now be described where the detector 10 is the radio wave sensor.

As illustrated in FIG. 2A, the surface of the water (the sealing water) inside the flush toilet 20 is positioned at the water seal surface S2 in the normal state in which the flush toilet 20 is not clogged, etc. For example, as illustrated in FIG. 2B, when foreign matter E clogs the flush toilet 20, the position of the water surface inside the flush toilet 20 becomes higher than the water seal surface S2. The overflow surface S1 is at a position higher than the water seal surface S2. The position of the overflow surface S1 is arbitrary. For example, the position of the overflow surface S1 is set to the position of the upper limit at which the water does not overflow out from the flush toilet 20 even if the flushing water for the next flushing of the feces is supplied to the flush toilet 20. In other words, if the water surface inside the flush toilet 20 is at a position higher than the overflow surface S1, there is a possibility that the water may overflow from the flush toilet 20 when the flushing water is supplied to the flush toilet 20.

The clog determiner 12 determines the clog state of the flush toilet 20 based on the detection result of the detector 10. The clog determiner 12 transmits the determination result to the controller 14. The specific determination method of the clog determiner 12 is described below.

Based on the determination result of the clog determiner 12, the controller 14 determines whether or not to prohibit the flushing water supply to the flush toilet 20. When the clog determiner 12 determines the flush toilet 20 to be clogged, the controller 14 prohibits the flushing water supply to the flush toilet 20.

The clog determiner 12 and the controller 14 each include, for example, a processing device (a microcomputer). Or, one processing device may function as the clog determiner 12 and the controller 14. Or, the detector 10 may include a processing device; and the function of the clog determiner 12 or the functions of both the clog determiner 12 and the controller 14 may be included in the detector 10.

The flushing water supplier 22 includes a valve (e.g., a solenoid valve), a motor, etc., and is connected to a water supply source such as waterworks, a water storage tank, etc. Switching is performed between the state in which the flushing water is supplied from the water supply source to the flush toilet 20 and the state in which the flushing water is not supplied from the water supply source to the flush toilet 20 by operating the valve or the motor. The flushing water supplier 22 also may appropriately include a tank storing water, a pump feeding water, etc.

When the user performs a flush operation for flushing the flush toilet 20 by using a not-illustrated remote control, etc., the controller 14 transmits a signal corresponding to the flush operation to the flushing water supplier 22. The flushing water is supplied to the flush toilet 20 by operating the valve or the motor of the flushing water supplier 22 based on the signal transmitted from the controller 14.

For example, when the controller 14 determines to prohibit the flushing water supply to the flush toilet 20, the signal for supplying the flushing water to the flush toilet 20 is not transmitted to the flushing water supplier 22 even when the remote control is operated.

The determination method of the clog determiner 12 will now be described with reference to FIG. 3A to FIG. 4D.

Figure 3A:
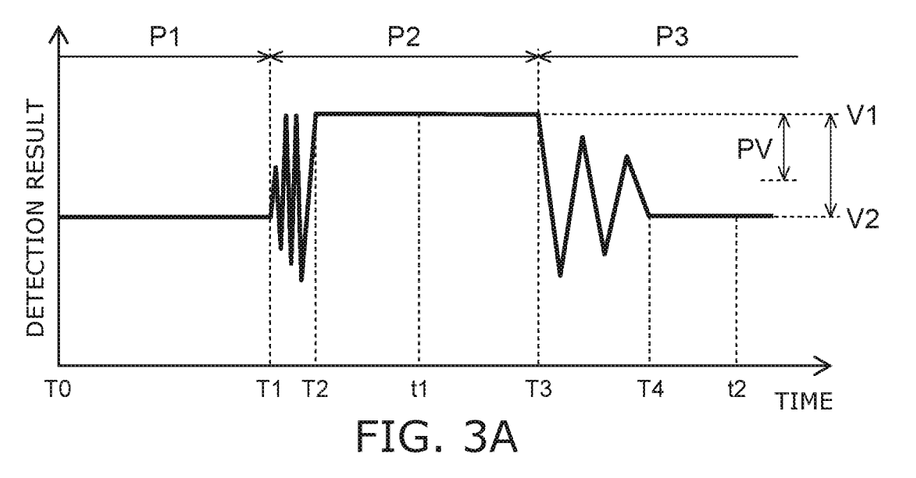
FIG. 3A is a graph illustrating detection results of the detector.
Figure 3B:
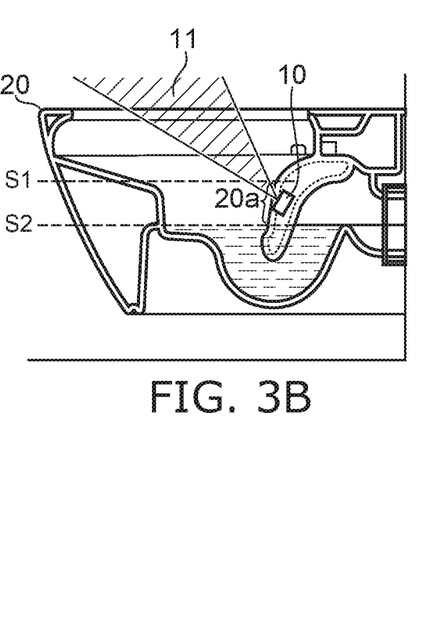
FIG. 3B to FIG. 3D are schematic views illustrating states of the flush toilet.
Figure 3C:
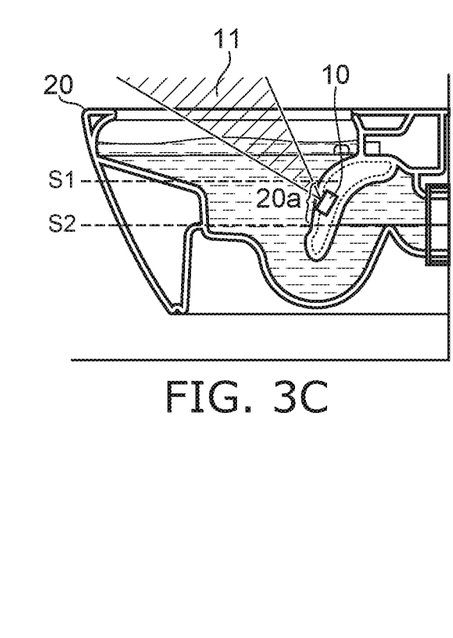
Figure 3D:
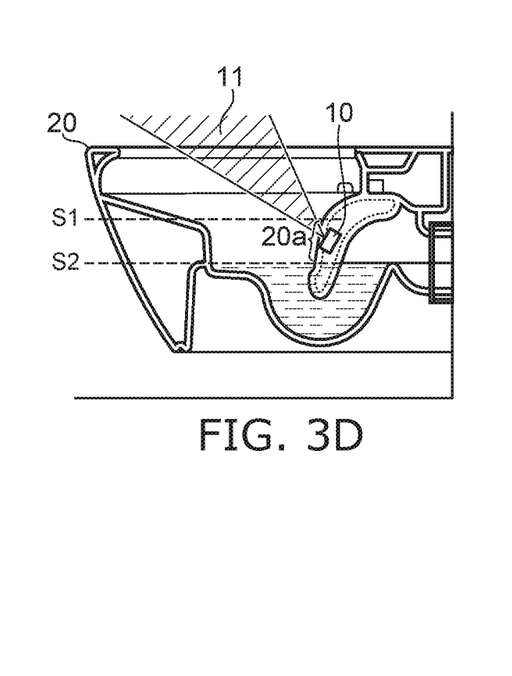
Figure 4A:
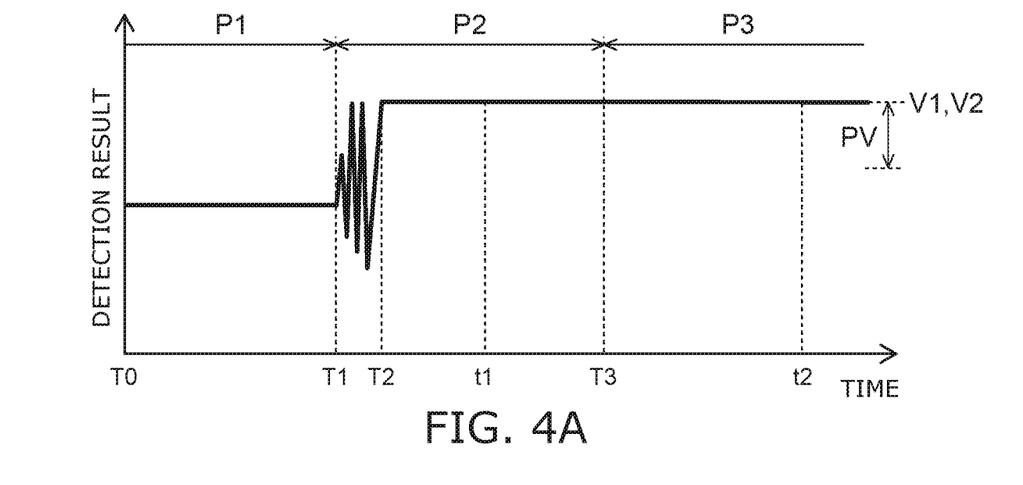
FIG. 4A is a graph illustrating detection results of the detector.

FIG. 3A and FIG. 4A are graphs illustrating detection results of the detector. FIG. 3B to FIG. 3D and FIG. 4B to FIG. 4D are schematic views illustrating states of the flush toilet.

In FIG. 3A and FIG. 4A, the horizontal axis is time; and the vertical axis is the detection result of the detector 10. In the example, the detector 10 is a radio wave sensor; and the vertical axis is the strength of the reflected wave detected by the detector 10. When the strength of the reflected wave increases, the value of the vertical axis may fluctuate both up and down due to the effects of a standing wave. Although graphs are shown in the examples described below in which the fluctuation occurs in the upward direction when the flush toilet 20 is clogged, fluctuation in the downward direction also may be included.

FIG. 3A illustrates the detection result when the flush toilet 20 is not clogged. In FIG. 3A, a period P1 illustrates the state before the flushing water supply. A period P2 illustrates the state of the flushing water supply. A period P3 illustrates the state after the flushing water supply has ended. Hereinafter, the state of the flush toilet 20 in the period P1 is called "before flushing." The state of the flush toilet 20 in the period P2 is called "when flushing;" and the state of the flush toilet 20 in the period P3 is called "after flushing." The state of the flush toilet 20 in these periods will now be described in detail.

At a time T0 of FIG. 3A, the water surface inside the flush toilet 20 is taken to be at the water seal surface S2. At the time T0, there is no water at the surface 20a inside the flush toilet 20 as illustrated in FIG. 3B. Therefore, the detection result is stable at a relatively small value.

Subsequently, at a time T1, the period P1 ends and the period P2 starts when the flushing water supply to the flush toilet 20 is started. In other words, at the time T1, a signal to cause the flushing water to be supplied to the flush toilet 20 is transmitted from the controller 14 to the flushing water supplier 22.

For example, from the time T1 to T2, the value of the detection result fluctuates greatly because this is directly after the supply of the flushing water has started, and because the water flow at the surface 20a is not stable. Subsequently, from the time T2 to a time T3, a large amount of flushing water is supplied to the flush toilet 20 as illustrated in FIG. 3C. From the time T2 to the time T3, the detection result stabilizes at a relatively large value because the entire surface 20a is covered with water.

At the time T3, the period P2 ends and the period P3 starts when the supply of the flushing water is stopped. In other words, at the time T3, a signal to stop the flushing water supply to the flush toilet 20 is transmitted from the controller 14 to the flushing water supplier 22.

Subsequently, the flow of the water at the surface 20a changes and the value of the detection result fluctuates greatly from the time T3 until the flushing water finishes draining at a time T4. From the time T4, the supplied flushing water has finished draining; and there is no water at the surface 20a in this state as illustrated in FIG. 3D. Therefore, the detection result stabilizes at a relatively small value similarly to the period P1. The time of stopping the flushing water supply from the flushing water supplier 22 and the time of the flow of the water changing at the surface 20a do not always match. For example, the flow channel may be long from the flushing water supplier 22 to the surface 20a, etc. In such a case, the detection result is stable at a relatively large value directly after stopping the supply from the flushing water supplier 22, that is, directly after the time T3, because the entire surface 20a is still covered with water. That is, the period P3 also includes the time from the stopping of the flushing water supply until directly before the flow of the water at the surface 20a starts to change.

FIG. 4A illustrates the detection result when the flush toilet 20 is clogged. In FIG. 4A, the periods P1 to P3 respectively illustrate the states before flushing, when flushing, and after flushing similarly to FIG. 3A.

Figure 4B:
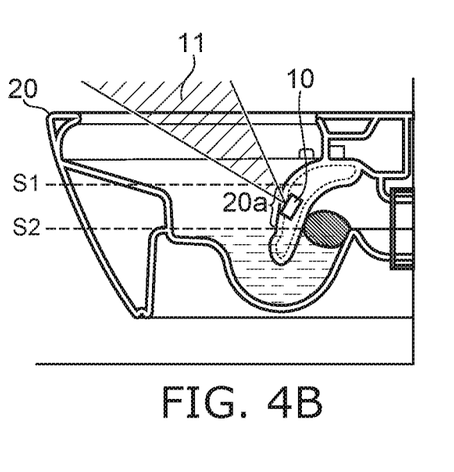
FIG. 4B to FIG. 4D are schematic views illustrating states of the flush toilet.

In the periods P1 and P2, the detection result of the detector 10 is substantially the same as the example illustrated in FIG. 3A. In other words, in the period P1 as illustrated in FIG. 4B, there is no water at the surface 20a; and in the period P2 as illustrated in FIG. 4C, the flushing water flows through the flush toilet 20; and the surface 20a is covered with water.

Figure 4C:
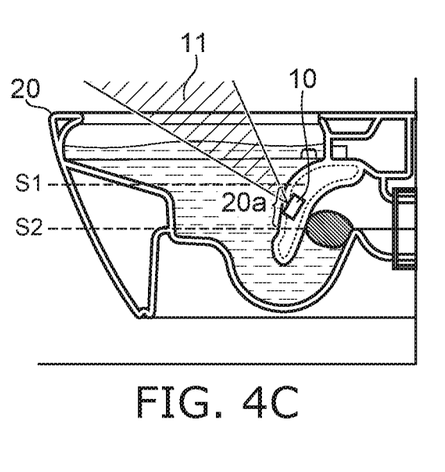
Figure 4D:
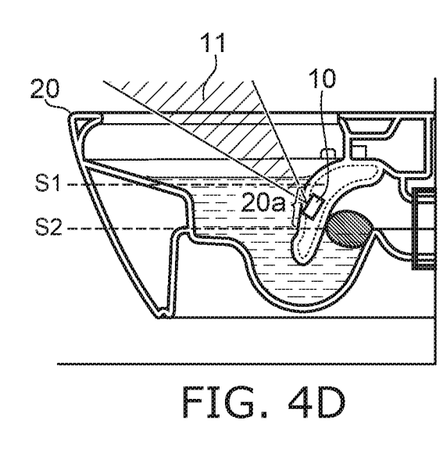

When the flush toilet 20 is clogged, the flushing water that is supplied to the period P2 is not drained from the flush toilet 20 and collects inside the flush toilet 20 as illustrated in FIG. 4C. In such a case, because the surface 20a is covered with water, the detection result has a relatively large value even after the supply of the flushing water ends at the time T3.

In the series of events described above, the clog determiner 12 compares a first detection result of the detector 10 in the period P2 when flushing and a second detection result of the detector 10 in the period P3 after flushing. Based on the comparison result, the clog determiner 12 determines the clog state of the flush toilet 20.

Specifically, the clog determiner 12 calculates the difference between the first detection result and the second detection result. If the difference is not less than a prescribed value, the clog determiner 12 determines the flush toilet 20 not to be clogged. If the difference is less than the prescribed value, the clog determiner 12 determines the flush toilet 20 to be clogged. For example, the absolute value of the difference is used when comparing to the prescribed value. The prescribed value is preset by the maintenance personnel of the toilet device 1. Or, the prescribed value may be set based on previous detection results of the detector 10, etc.

For example, in the example illustrated in FIG. 3A, the first detection result is acquired by the detector 10 at a timing t1 in the period P2; and the second detection result is acquired by the detector 10 at a timing t2 in the period P3. The clog determiner 12 compares the difference between a value V1 of the first detection result and a value V2 of the second detection result to a prescribed value PV. Because the absolute value of the difference V1−V2 is not less than the prescribed value PV, the flush toilet 20 is determined not to be clogged.

In the example illustrated in FIG. 4A, the value V1 of the first detection result acquired at the timing t1 in the period P2 is the same as the value V2 of the second detection result acquired at the timing t2 in the period P3. Accordingly, because the absolute value of the difference V1−V2 is less than the prescribed value PV, the flush toilet 20 is determined to be clogged.

Or, the clog determiner 12 may use the detection result of the detector 10 in the period P1 before flushing as the first detection result. In such a case, if the difference between the first detection result and the second detection result is not less than the prescribed value, the clog determiner 12 determines the flush toilet 20 to be clogged; and if the difference is less than the prescribed value, the clog determiner 12 determines the flush toilet 20 not to be clogged.

However, the state of the surface 20a may change in the period P1 due to functions ancillary to the flush toilet 20, the use mode of the flush toilet 20, etc. For example, there are cases where a device that sprays water (sterilizing water or service water) onto the surface inside the flush toilet 20 before flushing is provided in the flush toilet 20. When the water is sprayed onto the surface inside the flush toilet 20, many water droplets adhere to the surface 20a; and the detection result increases. Or, there are also cases where wet toilet paper adheres to the surface 20a. In such a case, the detection result is larger than when nothing is adhered to the surface 20a. As a result, the difference between the detection result in the period P1 and the detection result in the period P3 may not be less than the threshold; and it may be determined that the flush toilet 20 is clogged even though the flush toilet 20 is not clogged.

Therefore, it is desirable to use the detection result of the detector 10 in the period P2 when flushing as the first detection result. Thereby, the first detection result which is used as the reference value in the determination of the clog state of the flush toilet 20 can be more stable regardless of the ancillary functions of the flush toilet 20, the use mode of the flush toilet 20, etc. As a result, the clog state of the flush toilet 20 can be determined with higher accuracy.

The clog determiner 12 may repeatedly determine the clog state of the flush toilet 20 by setting multiple detection results acquired in the period P3 as the second detection result. For example, even when the flush toilet 20 is determined to be clogged based on the detection result acquired at the timing t2 of FIG. 4A, the water inside the flush toilet 20 subsequently may drain gradually; and the position of the water surface may drop. If the final determination result that the flush toilet 20 is clogged is obtained based on only the detection result at the timing t2, the flushing water cannot be supplied to the flush toilet 20 thereafter even though the water has drained.

Therefore, when the flush toilet 20 is determined to be clogged at the timing t2, the clog determiner 12 subsequently acquires the detection result at multiple times consecutively or intermittently and again determines the clog state of the flush toilet 20. Thereby, the prohibition of the flushing water supply to the flush toilet 20 in cases where the water inside the flush toilet 20 can drain over time can be prevented; and the ease of use of the flush toilet 20 can be improved.

Figure 5:
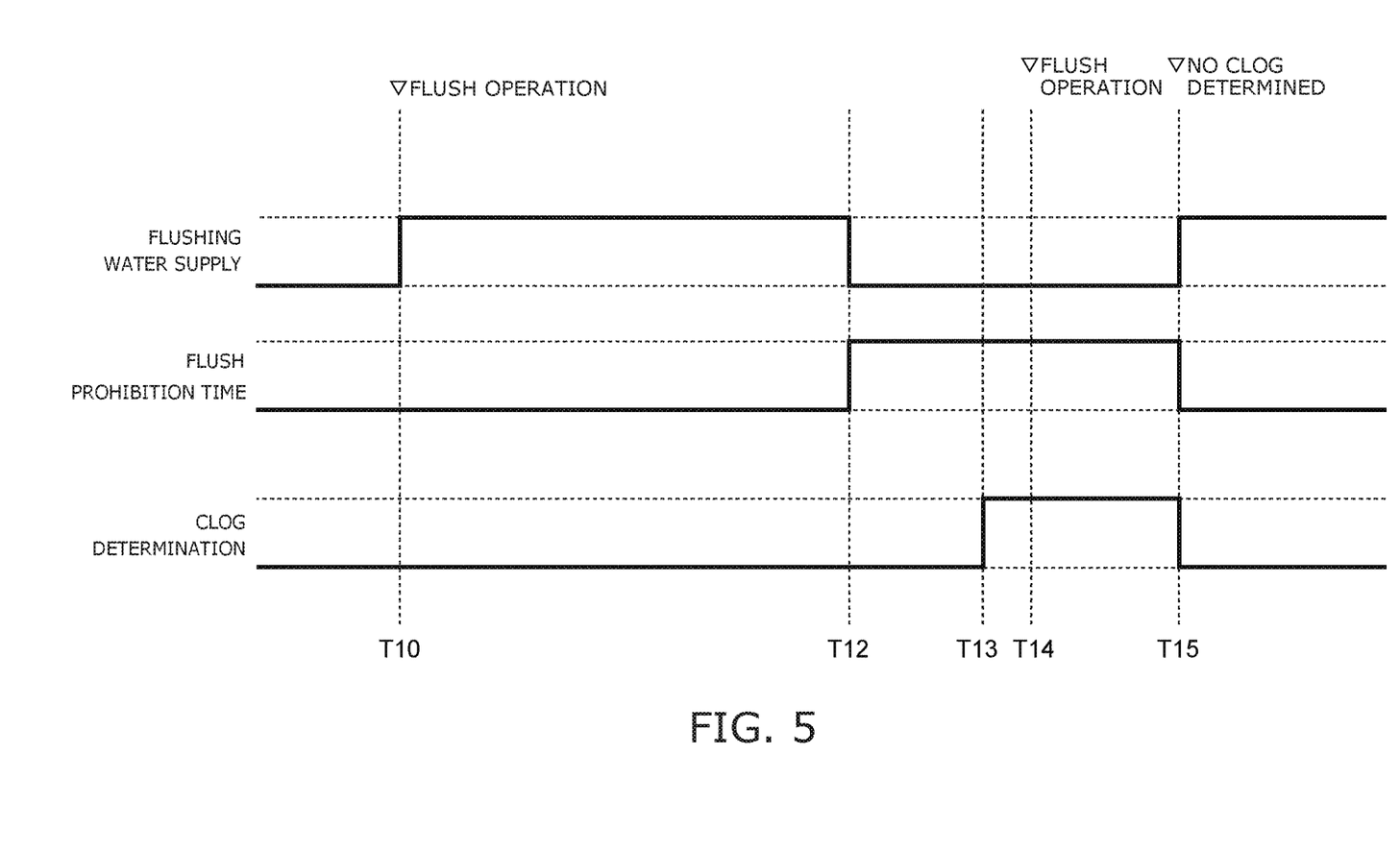
FIG. 5 is a timing chart illustrating an example of an operation of the toilet device according to the embodiment.

FIG. 5 is a timing chart illustrating an example of an operation of the toilet device according to the embodiment.

For example, as illustrated in FIG. 5, the flushing water supply from the flushing water supplier 22 is started when the controller 14 accepts the flush operation at a time T10. After supplying the flushing water to the flush toilet 20, the flushing water supply ends at a time T12. At this time, the controller 14 sets the flush prohibition time in which the flush operation of the flush toilet 20 temporarily is not accepted.

After a prescribed period of time has elapsed from the setting of the flush prohibition time, the determination of the clog state of the flush toilet 20 by the clog determiner 12 is started at a time T13. Also, although the flush operation is performed at a time T14, the controller 14 does not accept the flush operation because the flush prohibition time has not ended at the time T14. Subsequently, the determination of the clog state by the clog determiner 12 ends at a time T15. At this time, the setting of the flush prohibition time also is released if the flush toilet 20 is determined not to be clogged. Also, as in the example illustrated in FIG. 5, the controller 14 may perform the flushing water supply to the flush toilet 20 based on the flush operation performed within the flush prohibition time.

Figure 6:
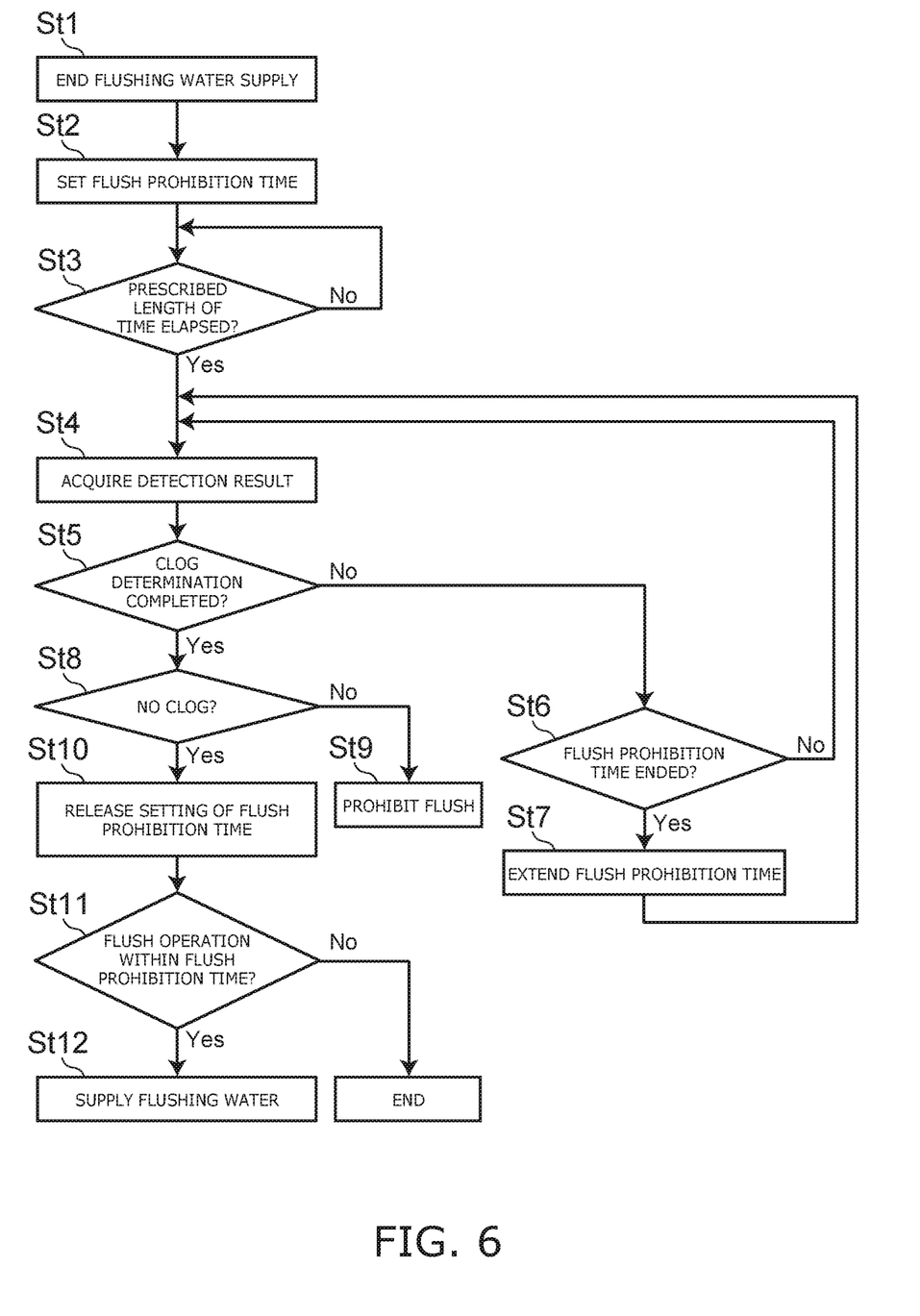
FIG. 6 is a flowchart illustrating the operation of the toilet device according to the embodiment.

FIG. 6 is a flowchart illustrating the operation of the toilet device according to the embodiment.

When the flushing water supply from the flushing water supplier 22 ends (step St1), the controller 14 sets the flush prohibition time (step St2). The controller 14 determines whether or not the prescribed period of time has elapsed from the setting of the flush prohibition time (step St3). When the prescribed period of time has elapsed, the clog determiner 12 acquires the detection result of the detector 10 (step St4). Continuing, the controller 14 determines whether or not the determination of the clog state of the flush toilet 20 by the clog determiner 12 has completed (step St5).

If the determination has not completed, the controller 14 determines whether or not the flush prohibition time has ended (step St6). If the flush prohibition time has not ended, step St4 is performed again. If the flush prohibition time has ended, the flush prohibition time is extended (step St7); and step St4 is performed again. Thereby, the determination of the clog state of the flush toilet 20 is performed in the extended flush prohibition time.

If it is determined in step St5 that the determination of the clog state has completed, the controller 14 refers to the determination result and determines whether or not the flush toilet 20 is clogged (step St8). If there is a clog, the controller 14 prohibits the flushing (step St9). When and after the flushing is prohibited, the flushing water supply to the flush toilet 20 is prohibited regardless of the flush prohibition time. If there is no clog, the controller 14 releases the setting of the flush prohibition time (step St10). When the flush operation is performed thereafter, the controller 14 accepts the flush operation and supplies the flushing water to the flush toilet 20.

When the flush prohibition is released, the controller 14 determines whether or not a flush operation occurred within the flush prohibition time (step St11). If there was no flush operation, the operation ends. If there was a flush operation, the flushing water is supplied to the flush toilet 20 (step St12).

Effects of the embodiment will now be described.

In the toilet device 1 according to the embodiment, the controller 14 sets, at least after the flushing water supply to the flush toilet 20 has ended, the flush prohibition time in which the flush operation for flushing the flush toilet temporarily is not accepted. Thereby, the flushing water is not supplied to the flush toilet 20 even if the flush operation is performed directly after the flushing water is supplied to the flush toilet 20. Accordingly, the overflow of the water from the flush toilet 20 due to the flushing water being supplied continuously in the state in which the flush toilet 20 is clogged can be prevented. Then, the clog determiner 12 determines the clog state of the flush toilet 20 based on the detection result of the detector 10 within the flush prohibition time. Because the next flushing water is not supplied within the flush prohibition time, the water level inside the flush toilet 20 is stable; and a more accurate determination result can be obtained.

Directly after the end of the flushing water supply, the water level inside the flush toilet 20 is not stable; and the detection result fluctuates greatly as in the time T3 to the time T4 of FIG. 3A. There is a possibility that an accurate determination result may not be obtained when the clog state is determined based on the detection result when the value is instantaneously increasing and decreasing. On the other hand, the water level stabilizes from the time T4 after a prescribed length of time has elapsed from the time T3; and the fluctuation of the detection result decreases. Therefore, it is desirable for the determination of the clog state to be performed after a prescribed period of time has elapsed after the flushing water supply has ended and the water level has become more stable. By determining the clog state in the state in which the water level is stable, a more accurate determination result can be obtained. The prescribed period of time is appropriately set according to the capacity inside the flush toilet 20, the flow rate of the flushing water drained from the flush toilet 20, the flow of the flushing water in the flush toilet 20, etc. As an example, in a general toilet, the prescribed period of time is set to be not less than 3 seconds and not more than 20 seconds, and more favorably not less than 5 seconds and not more than 15 seconds, and more favorably not less than 8 seconds and not more than 12 seconds.

As described above, if the flush toilet 20 is determined to be clogged, there is a method of repeatedly determining the clog state of the flush toilet 20 by acquiring the detection result multiple times consecutively or intermittently after the determination. According to this method, the prohibition of the flushing water supply when the water inside the flush toilet 20 drains over time can be prevented. However, the time necessary for the determination is longer than when it is determined quickly that the flush toilet 20 is not clogged. Therefore, the controller 14 extends the flush prohibition time when the clog determiner 12 cannot determine the clog state inside the flush toilet 20 within the flush prohibition time. The clog determiner 12 determines the clog state of the flush toilet 20 in the extended flush prohibition time. Thereby, the flush prohibition time is continued until the determination of the clog state ends. According to this method, the flush prohibition time is released more quickly when the flush toilet 20 is not clogged and the determination is completed quickly. If the flush toilet 20 is clogged and time is necessary for the determination to complete, the flush prohibition time is extended accordingly. Therefore, the useless setting of the flush prohibition time can be avoided while reliably preventing the flushing water being supplied in the state in which the flush toilet 20 is clogged.

When the flush operation is input within the flush prohibition time, the controller 14 supplies the flushing water to the flush toilet 20 at the timing when the determination by the clog determiner 12 has completed and the flush toilet 20 is determined not to be clogged. Thereby, an operation that matches the intention of the user is realized automatically after the end of the determination while preventing the overflow of the water from the flush toilet 20. Therefore, it is unnecessary for the user to perform the flush operation again after the flush prohibition time; and the ease of use of the toilet device 1 improves.

The controller 14 releases the setting of the flush prohibition time at the timing when the clog determiner 12 determines the flush toilet 20 not to be clogged. Thereby, the flush prohibition time can be shortened while preventing the overflow of the water from the flush toilet 20. By shortening the flush prohibition time, the time during which the flush operation from the user can be accepted is increased; and the ease of use of the toilet device 1 improves.

First Modification

Figure 7:
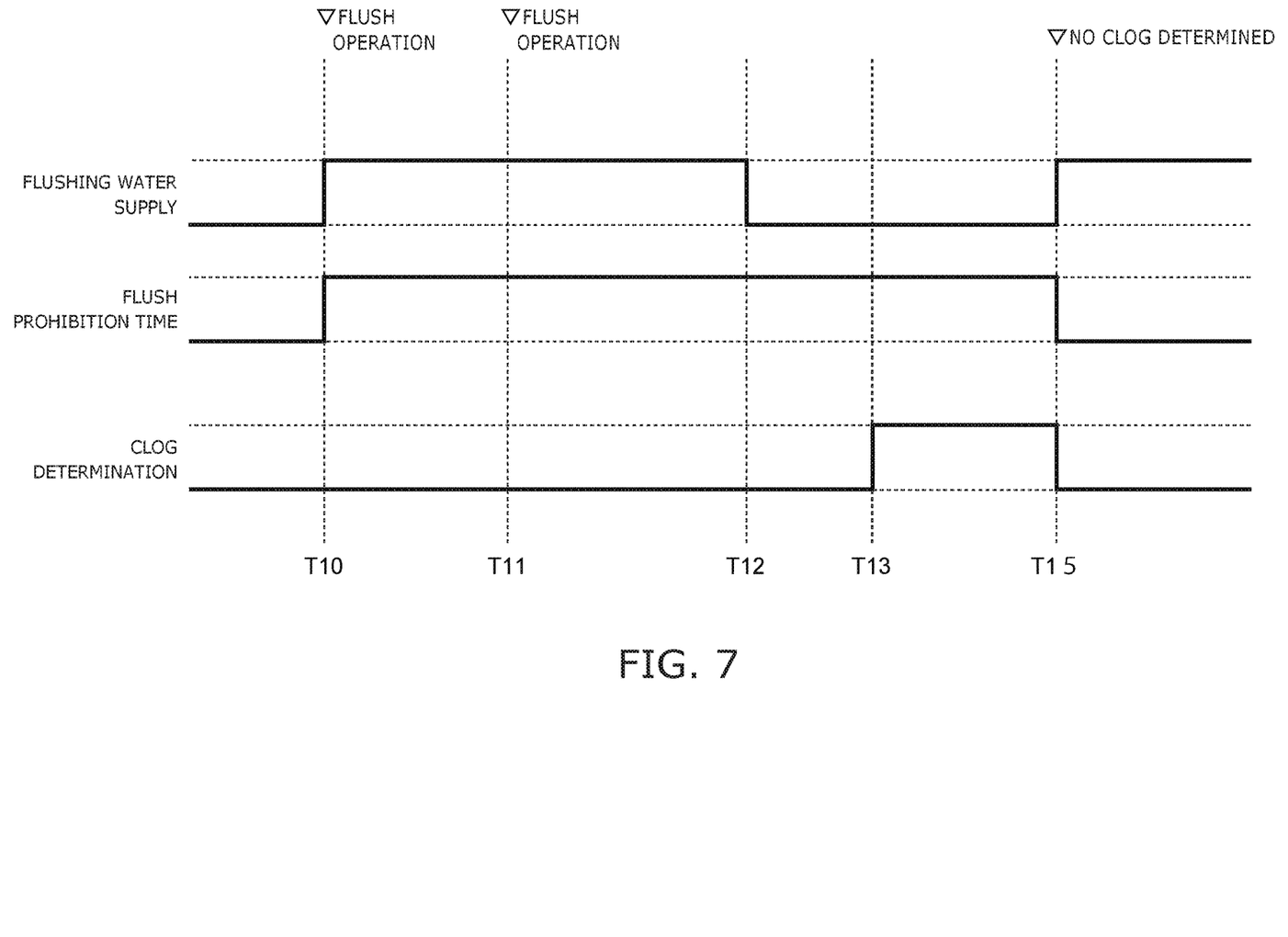
FIG. 7 is a timing chart illustrating an example of an operation of a toilet device according to a first modification of the embodiment.

FIG. 7 is a timing chart illustrating an example of an operation of a toilet device according to a first modification of the embodiment.

In the example illustrated in FIG. 7, the controller 14 sets the flush prohibition time when the flushing water supply is started at the time T10. Subsequently, the controller 14 continues the flush prohibition time even after the flushing water supply has ended at the time T12. In other words, in the example, the controller 14 sets the flush prohibition time not only after flushing but also when flushing.

In the example of FIG. 7, the flush operation also is performed at a time T11 when flushing. At this time, because the time T11 is within the flush prohibition time, the controller 14 does not accept the flush operation. However, similarly to the example illustrated in FIG. 5, the flushing water may be supplied to the flush toilet 20 at the timing at the time T15 when the determination of the clog state by the clog determiner 12 is completed and the flush toilet 20 is determined not to be clogged.

Figure 8:
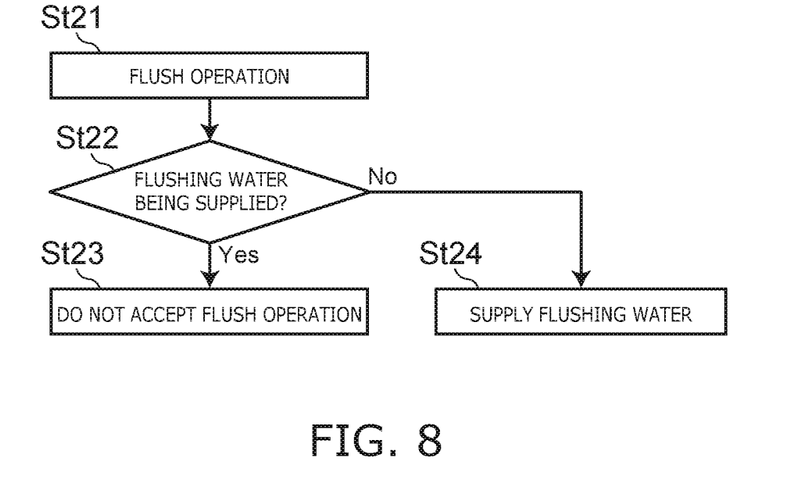
FIG. 8 is a flowchart illustrating the operation of the toilet device according to a first modification of the embodiment.

FIG. 8 is a flowchart illustrating the operation of the toilet device according to a first modification of the embodiment.

FIG. 8 illustrates the operation of the controller 14 when the flush operation is performed by the user. The flush operation is performed by the user (step St21); and the controller 14 determines whether or not the flushing water is being supplied (step St22). If the flushing water is being supplied, the time is within the flush prohibition time; therefore, the controller 14 does not accept the flush operation (step St23). If the flushing water supply is not being performed, the controller 14 accepts the flush operation and supplies the flushing water to the flush toilet 20 (step St24). Subsequently, when the flushing water supply ends, the operation illustrated in the flowchart of FIG. 6 is performed.

In the toilet device 1, a function of additionally performing some operation when performing the flush operation when flushing the flush toilet 20 may be provided. For example, such a function may include a function of extending the time of the flushing water supply. However, the likelihood of the overflow of the water from the flush toilet 20 increases when the flush time is extended and much flushing water is supplied in the state in which the flush toilet 20 is clogged. Therefore, it is desirable for the controller 14 to further set the flush prohibition time when performing the flushing water supply to the flush toilet 20. Thereby, the increase of the flushing water supplied to the flush toilet 20 can be prevented; and the overflow of the water from the flush toilet 20 when the flush toilet 20 is clogged can be prevented more reliably.

Second Modification

In each example described above, the clog determiner 12 determines the clog state of the flush toilet 20 within the flush prohibition time. This method may be changed so that in the toilet device according to the modification, the clog determiner 12 determines the clog state of the flush toilet 20 directly after the flush prohibition time.

Similarly to within the flush prohibition time, the water level inside the flush toilet 20 is stable directly after the end of the flush prohibition time as well. Accordingly, a more accurate determination result of the clog state can be obtained by determining the clog state of the flush toilet 20 directly after the flush prohibition time. When the flush toilet 20 is clogged, the controller 14 prohibits the flushing water supply to the flush toilet 20 based on the determination result of the clog state directly after the flush prohibition time. Therefore, the clog state of the flush toilet 20 can be determined more accurately while preventing the overflow of the water from the flush toilet 20.

In other words, in the invention, the flush prohibition time is set at least before the clog determination by the clog determiner 12. Because the next flushing water is not supplied within the flush prohibition time, the water level inside the flush toilet 20 is stable; and a more accurate determination result of the clog state can be obtained.

It is favorable for "directly after flush prohibition time" to be within 30 seconds from the end of the flush prohibition time. The fastest interchange time from when one user flushes the flush toilet 20 and exits from the space where the flush toilet 20 is mounted until the next user enters the space is substantially about 30 seconds. The likelihood of the next flush operation being performed is low for 30 seconds after the end of the flush prohibition time.

Or, more favorably, "directly after the flush prohibition time" is within 10 seconds from the end of the flush prohibition time. For example, the user performs the flush operation directly after excreting feces, etc., to suppress the spreading of odors. Subsequently, the flush operation is performed again to flush toilet paper, etc. This is the reason that the fastest interval between these flush operations is substantially about 10 seconds.

However, according to the user, the flush operation may be performed consecutively while excreting because the sound of supplying the flushing water is used to cancel the sound when excreting. In such a case, there is a possibility that the flush operation may be performed directly after the flush prohibition time; and the flushing water may be supplied to the flush toilet 20 before the determination of the clog state by the clog determiner 12. Accordingly, it is desirable for the clog state to be determined within the flush prohibition time to more reliably prevent the overflow due to the flushing water supplied to the flush toilet 20.

While certain embodiments have been described, the invention is not intended to limit these descriptions. Design modification appropriately made by a person skilled in the art in regard to the embodiments is within the scope of the embodiments to the extent that the features of the embodiments are included. For example, the shape, the dimension, the material, the disposition, the installation feature or the like of the components included in the toilet device 1 are not limited to the illustration and can be appropriately modified.

The components included in the embodiments described above can be combined within the extent of technical feasibility, and any combined components also are included in the scope of the invention to the extent that the feature of the invention is included.

What is claimed is:

1. A toilet device, comprising:
    a detector configured to detect at least one of a water level inside a flush toilet or an indicator associated with the water level;
    a clog determiner determining a clog state of the flush toilet based on a detection result of the detector; and
    a controller determining, based on a determination result of the clog determiner, whether or not to prohibit a flushing water supply to the flush toilet,
    the controller setting a first flush prohibition time during a period from a start of the flush water supply to an end of the flush water supply, a flush operation for flushing the flush toilet not being accepted temporarily in the first flush prohibition time, even if the flush toilet not being clogged,
    the clog determiner determining the clog state of the flush toilet based on the detection result of the detector within the first flush prohibition time or directly after the first flush prohibition time,
    wherein if the flush toilet is not clogged according to the determination result of the clog determiner, the controller releases the setting of the first flush prohibition time for a period before a next flushing, and
    wherein if the flush toilet is clogged according to the determination result of the clog determiner, the controller prohibits the flush operation regardless of the first flush prohibition time,
    wherein the first flush prohibition time is necessarily set during the period from the start of the flush water supply to the end of the flush water supply, and
    wherein the first flush prohibition time begins during the period from the start of the flush water supply to the end of the flush water supply.

2. The toilet device according to claim 1, wherein the clog determiner determines the clog state of the flush toilet after a prescribed period of time after the flushing water supply to the flush toilet has ended.

3. The toilet device according to claim 1, wherein
    when the clog determiner cannot determine the clog state of the flush toilet within the first flush prohibition time, the controller extends the first flush prohibition time, and
    the clog determiner determines the clog state of the flush toilet in the extended first flush prohibition time.

4. The toilet device according to claim 1, wherein when the flush operation is input within the first flush prohibition time, the controller supplies flushing water to the flush toilet at a timing when the determining by the clog determiner is completed and the flush toilet is determined not to be clogged.

5. The toilet device according to claim 1, wherein the controller further sets a second flush prohibition time when performing the flushing water supply to the flush toilet, and
    wherein the second flush prohibition time begins during the flushing water supply to the flush toilet.

6. The toilet device according to claim 1, wherein the controller releases the setting of the first flush prohibition time at a timing when the clog determiner determines the flush toilet not to be clogged.

* * * * *